United States Patent
Ribarov et al.

(10) Patent No.: US 9,457,909 B2
(45) Date of Patent: Oct. 4, 2016

(54) RESISTIVE-INDUCTIVE DE-ICING OF AIRCRAFT FLIGHT CONTROL SURFACES

(71) Applicant: Hamilton Sundstrand Corporation, Windsor Locks, CT (US)

(72) Inventors: Lubomir A. Ribarov, West Hartford, CT (US); Jacek F. Gieras, Glastonbury, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 486 days.

(21) Appl. No.: 13/870,403

(22) Filed: Apr. 25, 2013

(65) Prior Publication Data

US 2014/0319278 A1    Oct. 30, 2014

(51) Int. Cl.
*B64D 15/12*    (2006.01)
*B64D 15/14*    (2006.01)
*B64D 15/00*    (2006.01)

(52) U.S. Cl.
CPC ............. *B64D 15/12* (2013.01); *B64D 15/14* (2013.01); *B64D 15/00* (2013.01)

(58) Field of Classification Search
CPC ....... B64D 15/12; B64D 15/14; B64D 15/00
See application file for complete search history.

(56) References Cited

U.S. PATENT DOCUMENTS

| 2003/0155467 | A1* | 8/2003 | Petrenko | A63C 1/30 244/134 R |
| 2006/0086715 | A1* | 4/2006 | Briggs | B32B 17/10174 219/488 |
| 2008/0251642 | A1* | 10/2008 | Boschet et al. | 244/134 D |
| 2010/0038475 | A1* | 2/2010 | Zecca | B64D 15/12 244/1 N |
| 2011/0049300 | A1* | 3/2011 | Safai et al. | 244/134 D |

OTHER PUBLICATIONS

Al-Khalil, "Thermo-Mechanical Expulsion Deicing Systems—TMEDS," AIAA Paper, 692, 2007; 13 pages.
Al-Khalil, et al., "A Hybrid Anti-Icing Ice Protection System," 35th Aerospace Sciences Meeting & Exhibit;Jan. 6-7, 1997; 9 pages.
Goraj, "An Overview of the Deicing and Antiicing Technologies with Prospects for the Future," 24th International Congress of the Aeronatutical Sciences (ICAS 2004); Aug. 29-Sep. 3, 2004; 11 pages.
Stopperan, "Understanding Etched-Foil Heaters," Machine Design. com, Sep. 20, 2012; pp. 55-58.

* cited by examiner

*Primary Examiner* — Nicholas McFall
(74) *Attorney, Agent, or Firm* — Cantor Colburn LLP

(57) ABSTRACT

Embodiments of the disclosure include a de-icing system for an aircraft. The de-icing system includes a plurality of resistive-inductive heating elements inserted adjacent to a flight control surface and a controller configured to provide a supply current to each of the plurality of resistive-inductive heating elements. Each of the plurality of resistive-inductive heating elements produces an electromagnetic field normal to the flight control surfaces and resistive heat in response to the supply current. The electromagnetic field induces an eddy current in the flight control surface.

6 Claims, 3 Drawing Sheets

RESISTIVE-INDUCTIVE DE-ICING OF AIRCRAFT FLIGHT CONTROL SURFACES

BACKGROUND OF THE INVENTION

The present disclosure relates to de-icing systems for an aircraft, and more specifically, to resistive-inductive de-icing systems for aircraft flight control surfaces.

Icing of aircraft flight control surfaces during adverse ambient flight conditions is a well-known aerodynamic problem. Ice formation and accumulation on flight control surfaces may cause the performance of the component and/or system to be degraded. In addition, the shearing of accumulated ice may cause damage to aircraft components in the downstream path of the flying ice. Additional damage to "runback" where melted ice water travels along the de-iced surface and subsequently re-freezes on the un-heated portions of the de-iced surface are also very serious. Such damages may incapacitate various aircraft flight control systems and could, in the extreme case, lead to a catastrophic aircraft damage causing loss of property and life. Hence, the proposed de-icing system can be configured to be either "running wet" (i.e., just enough heat is supplied to the de-iced surface to convert ice to liquid water) or "running dry" (i.e., enough heat is supplied to the de-iced surface to convert ice to water vapor). Both configurations are plausible and can be supported by the proposed de-icing system. However, in order to avoid any "runback"-related problems, it may be beneficial to design the de-icing system in a "run dry" configuration.

One common method for preventing icing on aerodynamic control surfaces is the application of various anti-icing fluids to create a shield coating over the protected aerodynamic control surface. The fluid is designed to not allow ice formation and to aid in repelling any accumulated ice and/or snow.

Other de-icing approaches that have been developed include in-flight de-icing for both moving parts as well as fixed aerodynamic surfaces. Some of the most widely used methods for de-icing flight control surfaces are based on electrical resistive heating or pneumatic heating using hot pressurized air bleed from a predetermined compressor stage of the aircraft engines. Existing pneumatic systems result in a direct parasitic loss on the thermodynamic performance of the engines. Due to the desire to minimize weight associated with plumbing and valves required by pneumatic systems, the flight control surfaces that are heated are typically limited to the surfaces located in the vicinity of the hot air bleed source, i.e. the main engines. In most modern civil aircraft configurations this means that the wings' leading edges will be heated (due to the proximity to the pod-style under-wing suspended engines) but other critical flight surfaces such as the leading edge of the vertical stabilizer (fin), or the horizontal stabilizers, or the nose cone of the aircraft fuselage may not be heated.

BRIEF DESCRIPTION OF THE INVENTION

According to one embodiment, a de-icing system for an aircraft includes a plurality of solenoids disposed adjacent to a flight control surface and a controller configured to provide a supply current to each of the plurality of solenoids. Each of the plurality of solenoids produces an electromagnetic field in response to the supply current. The electromagnetic field induces an eddy current in the de-iced flight control surface.

Accordingly to another embodiment, the de-icing system includes a plurality of resistive-inductive (RL) heating elements inserted adjacent to a flight control surface and a controller configured to provide a supply current to each of the plurality of resistive-inductive heating elements. Each of the plurality of resistive-inductive heating elements produces an electromagnetic field and resistive heat in response to the supply alternating current (AC). The electromagnetic field induces an eddy current in the conductive flight control surface.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Embodiments of the present disclosure include a system for de-icing of aircraft flight control surfaces that do not require electrical connections, wires, or thermal plumbing/mechanical connections to the aircraft engine. The system for de-icing of aircraft flight control surfaces includes an array of heating elements in the form of coils (solenoids) that are used to produce an alternating current (AC) electromagnetic field in the inside of a flight control surface to be protected. Heat is also dissipated in the solenoids as Joule's losses, $I^2R$, where I is the electric current and R is the resistance. The flight control surfaces may include, but are not limited to, wing's leading edge, slats, horizontal/vertical stabilizers leading edges, etc. In one embodiment, the solenoids may be inserted directly on an inner surface of a flight control surface or in close proximity thereto.

Figure 1:
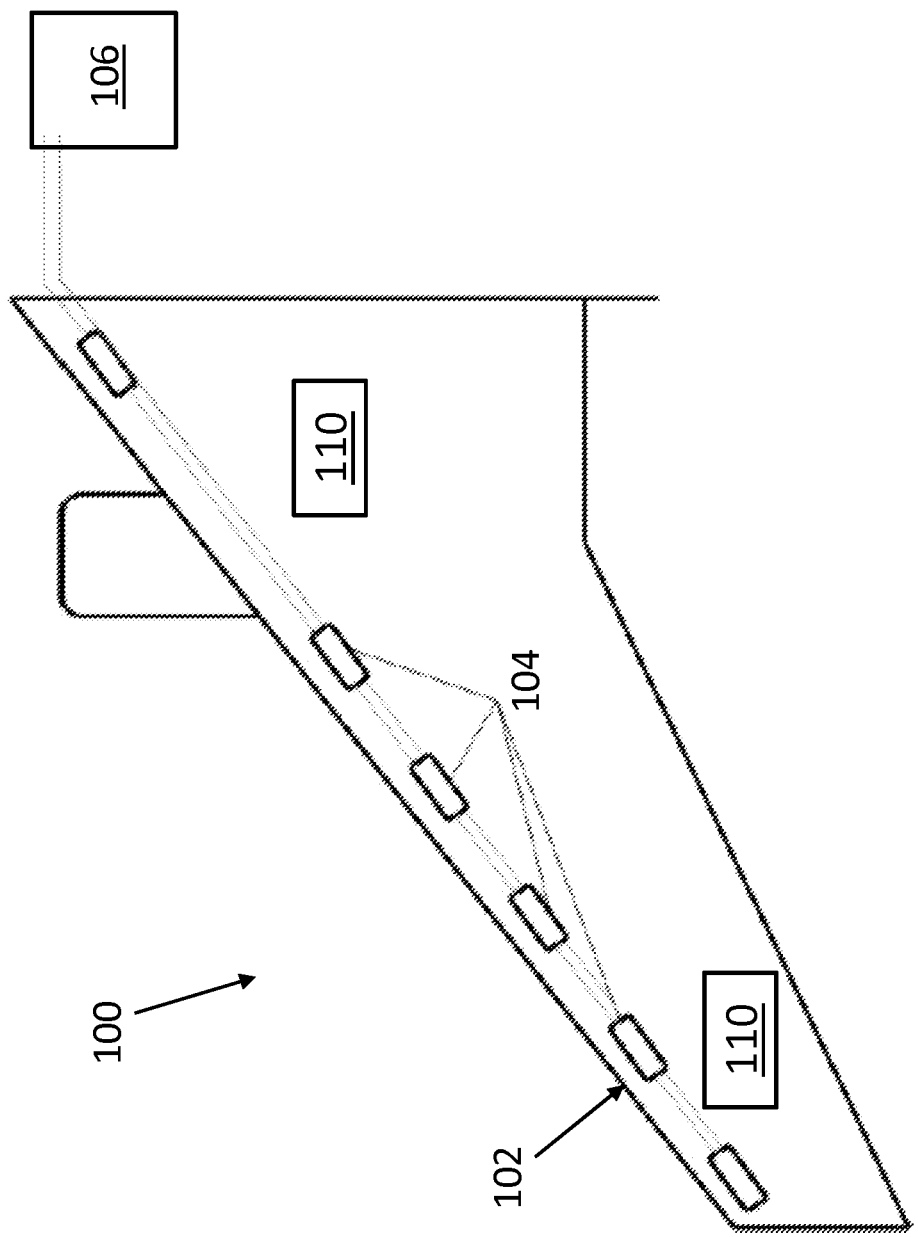
FIG. 1 is a schematic diagram of a portion of an aircraft de-icing system in accordance with an embodiment of the disclosure.

Referring now to FIG. 1, a schematic diagram of a portion of an aircraft de-icing system 100 in accordance with an embodiment of the disclosure is shown. As illustrated, the aircraft de-icing system 100 includes a plurality of solenoids 104 that disposed directly on, in close proximity to, a flight control surface 102. In one embodiment, multiple solenoids 104 can be located in various locations inside of the leading edge of an aircraft wing to provide modular control and a high operability/survivability rate in the case of the failure a single solenoid 104. Each of the plurality of solenoids 104 are connected to a controller 106 that is configured to supply power to the solenoids 104. In one embodiment, the aircraft de-icing system 100 also includes one or more sensors 110 that are configured to monitor the ambient conditions around the aircraft, such as the temperature of the flight control surface 102. The sensors 110 may also be configured to provide the controller 106 with information regarding the ambient conditions around the aircraft.

The solenoids 104 are configured to receive power from the controller 106 and to responsively create an electromagnetic field. In one embodiment, the electromagnetic field produced by the solenoids 104 induces an eddy current in nearby a flight control surface 102, which causes the flight control surface 102 to heat and melt (in a "run wet" configuration) or to heat and evaporate (in a "run dry" configuration) any ice accumulation.

In one embodiment, the controller 106 may vary the current supplied to the solenoids 104 thus controlling the strength of the electromagnetic field produced by the solenoids 104, which in turn is controlled to match the ambient conditions around the aircraft. In one embodiment, the controller 106 may use a pulse-width modulated (PWM) current supply signal to control the strength of the electromagnetic field produced by the solenoids 104. The current supply provided by the controller 106 to the solenoids may come from any aircraft on-board source including, but not limited to, an engine generator, a storage battery via an inverter, an auxiliary power unit (APU), or the like. In one embodiment, the solenoids 104 may be activated at any time during the flight with no direct engine performance decrease. In another embodiment, the solenoids 104 may be activated on the ground while the aircraft is stationary and the engines are turned off by using electric supply power from the APU or an external power (EP) ground cart.

In one embodiment, to reduce the weight of the aircraft de-icing system 100, solenoids 104 can be made of aluminum rather than the traditional copper wiring. In other embodiments, an array (matrix) of coils made of copper foil can be used to further reduce the weight of the aircraft de-icing system 100.

Figure 2:
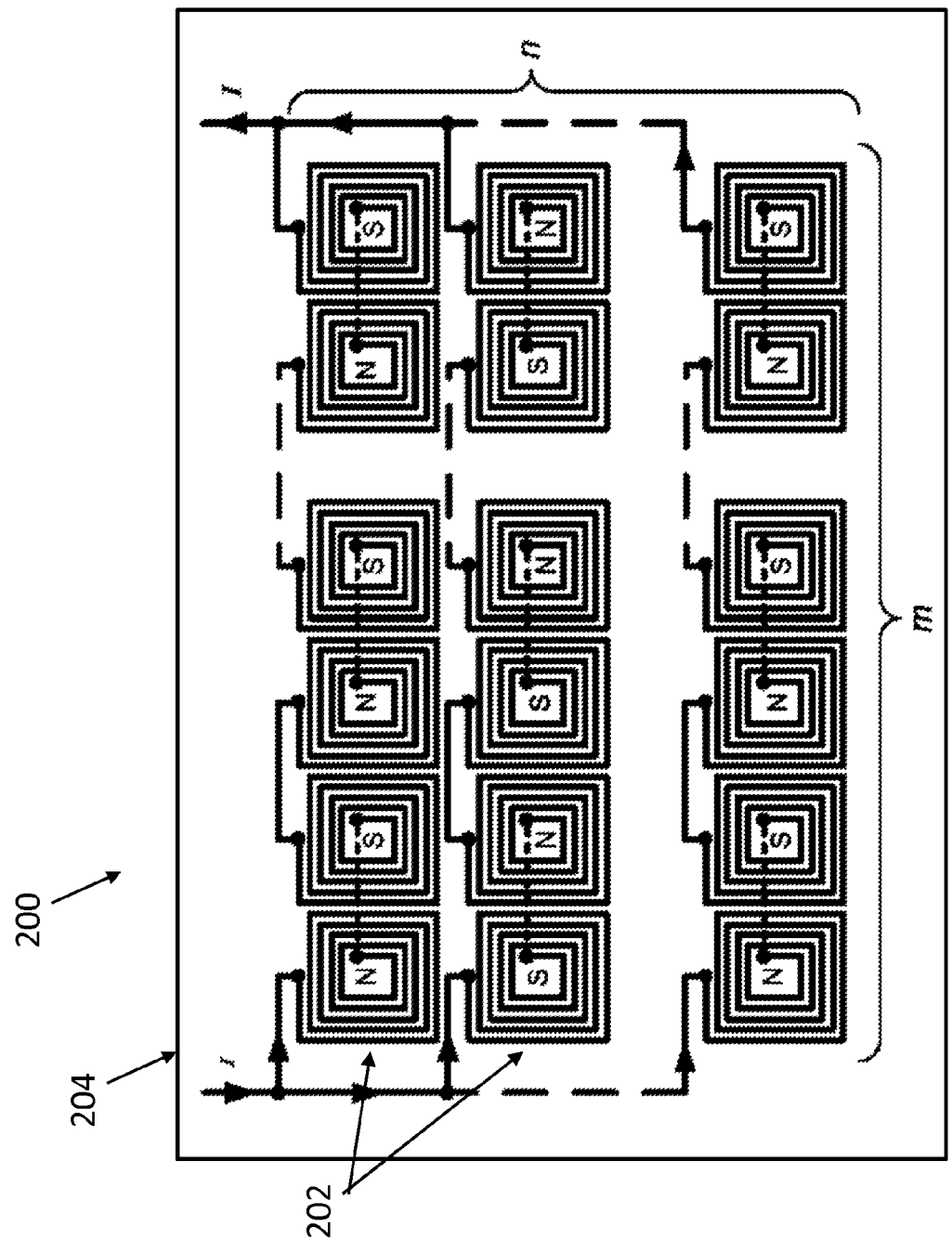
FIG. 2 is a schematic diagram of a matrix of resistive-inductive heating elements of an aircraft de-icing system in accordance with an embodiment of the disclosure.

In one embodiment, an aircraft de-icing system shown in FIG. 1 may be configured to utilize a plurality of resistive-inductive heating elements. Referring now to FIG. 2, a matrix 200 of resistive-inductive heating elements 202 of an aircraft de-icing system in accordance with an embodiment of the disclosure is shown. In one embodiment, a flight control surface of an aircraft is covered with a foil mesh incorporating a matrix 200 of m×n resistive-inductive heating elements 202, also referred to as RL elements 202. In one embodiment, the matrix 200 includes a plurality of RL elements 202 connected in series (m elements) and in parallel (n elements). The numbers n and m can be selected based on the application, i.e., a surface area to be heated, voltage, frequency and available power. The RL elements 202 are made of copper or other conductive material, e.g., aluminum. In one embodiment, the matrix 200 of RL elements 202 can be made by stamping or using photolithography. In one embodiment, the matrix 200 of RL elements 202 is disposed on a substrate can be extremely thin and flexible, for example the thickness of the substrate can be as thin as 0.0005 in=0.0127 mm. In one embodiment, the thin polyimide substrates can be easily shaped to adjust their shape to the shape of the flight control surfaces of the wings' leading edges or slats. In addition, the matrix construction allows adjustment of the heater to the given heating demands, surface and parameters of AC power source. While this provides sufficient thermal power to de-ice the flight control surfaces, it helps minimize the "runback" problem, thus keeping the downstream un-heated portions of the de-iced surfaces ice-free.

In one embodiment, in addition to resistive heating the RL elements 202 are configured to utilize inductance to produce eddy currents in the flight control surface that the matrix 200 is disposed upon. The RL elements 202 shown in FIG. 2 are arranged in such a way as to create opposite polarity in their series connection, i.e., N, S, N, S, N, . . . . This provides closed lines of the magnetic flux between neighboring elements and intensive generation of eddy currents in the skin of the flight control surface.

In one embodiment, the frequency of current supply is f=400 Hz, and the flight control surface is made of aluminum alloy having a conductivity of $\sigma_{Al}=25 \times 10^6$ S/m and magnetic permeability equal to the permeability of free space $\mu_0=0.4\pi \times 10^{-6}$ H/m. The equivalent depth of penetration of the electromagnetic field into skin of the flight control surface is:

$$\delta = \frac{1}{\sqrt{\pi f \mu_0 \sigma_{Al}}} = \frac{1}{\sqrt{\pi \times 400 \times 0.4 \times \pi \times 10^{-6} \times 25 \times 10^6}} = 5.033 \times 10^{-3} \text{ m} \approx 5 \text{ mm.}$$

Accordingly, an aluminum skin of a flight control surface with a thickness of less than five millimeters may be totally penetrated by the 400-Hz electromagnetic field that provides intensive eddy currents and effective inductive heating.

Figure 3:
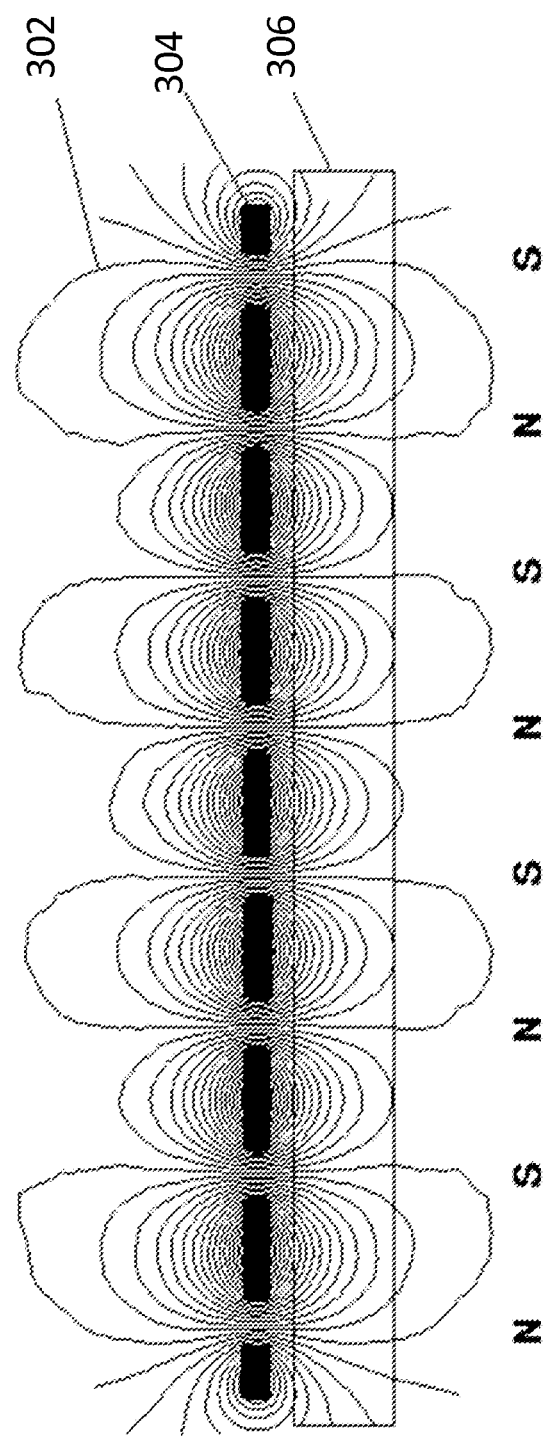
FIG. 3 is a schematic diagram illustrating a magnetic field produced by several elements in accordance with an embodiment of the disclosure.

Referring now to FIG. 3, a schematic diagram illustrating a magnetic field 302 produced by one or more elements 304 are shown. The elements 304 may be solenoids, as discussed with reference to FIG. 1, or RL elements configured into a matrix, as discussed with reference to FIG. 2. As illustrated, the magnetic field 302 produced by the elements 304 is normal to the flight control surface 306 and it is configured to penetrate the flight control surface 306.

In one embodiment, it is assumed that the coefficient of heat transfer $\alpha_0=25$ W/(m² K), coefficient of air stream $c_a=1.0$, temperature rise $\Delta\theta=40°$ C. (from −35 to 5° C.), surface to be heated $\Delta S=1.0$ m², velocity of aircraft v=800 km/h. Accordingly, the thermal resistance is:

$$R_{th} = \frac{1}{\alpha_0(1+c_a\sqrt{v})\Delta S} = \frac{1}{25.0 \times \left(1+1.0\sqrt{\frac{800}{3.6}}\right) \times 1.0} = 2.515 \times 10^{-3}$$

K/W and the power converted into heat (thermal flux) is:

$$P_h = \frac{\Delta\theta}{R_{th}} = \frac{40}{2.515 \times 10^{-3}} = 15907.12$$

W.

For the approximately 16 kW of power need to be delivered by an AC electric source to heat up a 1 m² of the surface of the wing skin of the leading edge or the slats, the current delivered by a three-phase AC source 115/200 V, 400 Hz at power factor=0.8 must be:

$$I_{ph} = \frac{15907.12}{3 \times 115 \times 0.8} = 57.6$$

A.

This condition can be met if the heater inductance is, e.g., $L_{ph}=0.48$ mH and its resistance is $R_{ph}=1.59\Omega$. After simple calculations, one will get the modulus of impedance $Z_{ph}=1.966\Omega$, power factor=0.797, $I_{ph}=V_{ph}/Z_{ph}=57.6$ A and dissipated power $3I_{ph}R^2=15836.4$ W.

In one embodiment, by using the electromagnetic or resistive-inductive based de-icing systems, weight savings in the form of the eliminated pneumatic tubing and anti-icing valves can be realized. In addition, a reduced amount, and therefore weight, of fuel needs to be consumed by the main engines to generate the needed amount of power while accounting for the parasitic losses due to the hot compressed air bleed off the engine's compressor stages. In conventional pneumatic-based de-icing systems, this hot compressed air is used for de-icing of various flight control surfaces.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A de-icing system for an aircraft comprising:
    a flexible substrate incorporating a matrix of a plurality of resistive-inductive heating elements adapted to be carried by a flight control surface;
    said matrix configuration of the plurality of resistive-inductive heating elements including an m×n matrix with the m resistive-inductive heating elements connected in series and the n resistive-inductive heating elements in parallel;
    said matrix configuration of the plurality of resistive-inductive heating elements being arranged such that adjacent resistive-inductive heating elements have opposite magnetic polarity;
    a controller configured to provide a supply current to each of the plurality of resistive-inductive heating elements, wherein the controller may receive current from a plurality of current sources;
    wherein each of the plurality of resistive-inductive heating elements produces an electromagnetic field and resistive heat in response to the supply current and wherein the electromagnetic field normal to the flight control surfaces induces an eddy current in the flight control surface;
    and wherein the electromagnetic field produced by each of the plurality of resistive-inductive heating elements is strong enough to totally penetrate the flight control surface.

2. The de-icing system of claim 1, further comprising:
    one or more sensors configured to monitor the ambient conditions of the flight control surface, wherein the controller is configured to receive information from the one or more sensors.

3. The de-icing system of claim 2, wherein the controller is configured to responsively control the supply current provided to each of the plurality of resistive-inductive heating elements based on the information received from the one or more sensors.

4. The de-icing system of claim 1, wherein the controller may receive current from a source external to the aircraft.

5. The de-icing system of claim 1, wherein the controller may receive current from both an on-board source or external source which includes one or more of an electric supply of power from an auxiliary power unit, an engine generator, a storage battery, and an external power (EP) ground cart.

6. The de-icing system of claim 5, wherein the de-icing system may be activated on the ground while the aircraft is stationary and the engines are turned off by using electric supply power from the auxiliary power unit.

* * * * *